United States Patent [19]
Nelson et al.

[11] 3,837,359
[45] Sept. 24, 1974

[54] HYDRAULIC CONTROL VALVE WITH PRESSURE SENSITIVE LATCH

[75] Inventors: Vaughn A. Nelson, Downers Grove; Donald K. Fadden, Clarendon Hills; Richard J. Lech, Chicago, all of Ill.

[73] Assignee: International Harvester Company, Chicago, Ill.

[22] Filed: May 18, 1973

[21] Appl. No.: 361,661

[52] U.S. Cl. .......................... 137/624.27, 192/85 R
[51] Int. Cl. ............................................. F15b 13/01
[58] Field of Search................. 137/624.27; 251/297

[56] References Cited
UNITED STATES PATENTS

| | | | |
|---|---|---|---|
| 3,247,768 | 4/1966 | Tennis | 137/624.27 X |
| 3,511,276 | 5/1970 | Jessen et al. | 137/624.27 X |
| 3,618,634 | 11/1971 | Nelson | 137/624.27 X |
| 3,640,146 | 2/1972 | Barnes | 192/87.19 X |

*Primary Examiner*—Benjamin W. Wyche
*Attorney, Agent, or Firm*—John A. Schaerli; Floyd B. Harman

[57] ABSTRACT

A valve having a fluid control spool and detent assembly for securing the spool in a predetermined position. The detent is secured by the interaction of a ball series and a groove, the holding force being delivered by hydraulic pressure. A detent release is actuated by a fall in hydraulic pressure thereby unlocking the balls. Springs return the detent and spool to a neutral position upon release.

2 Claims, 1 Drawing Figure

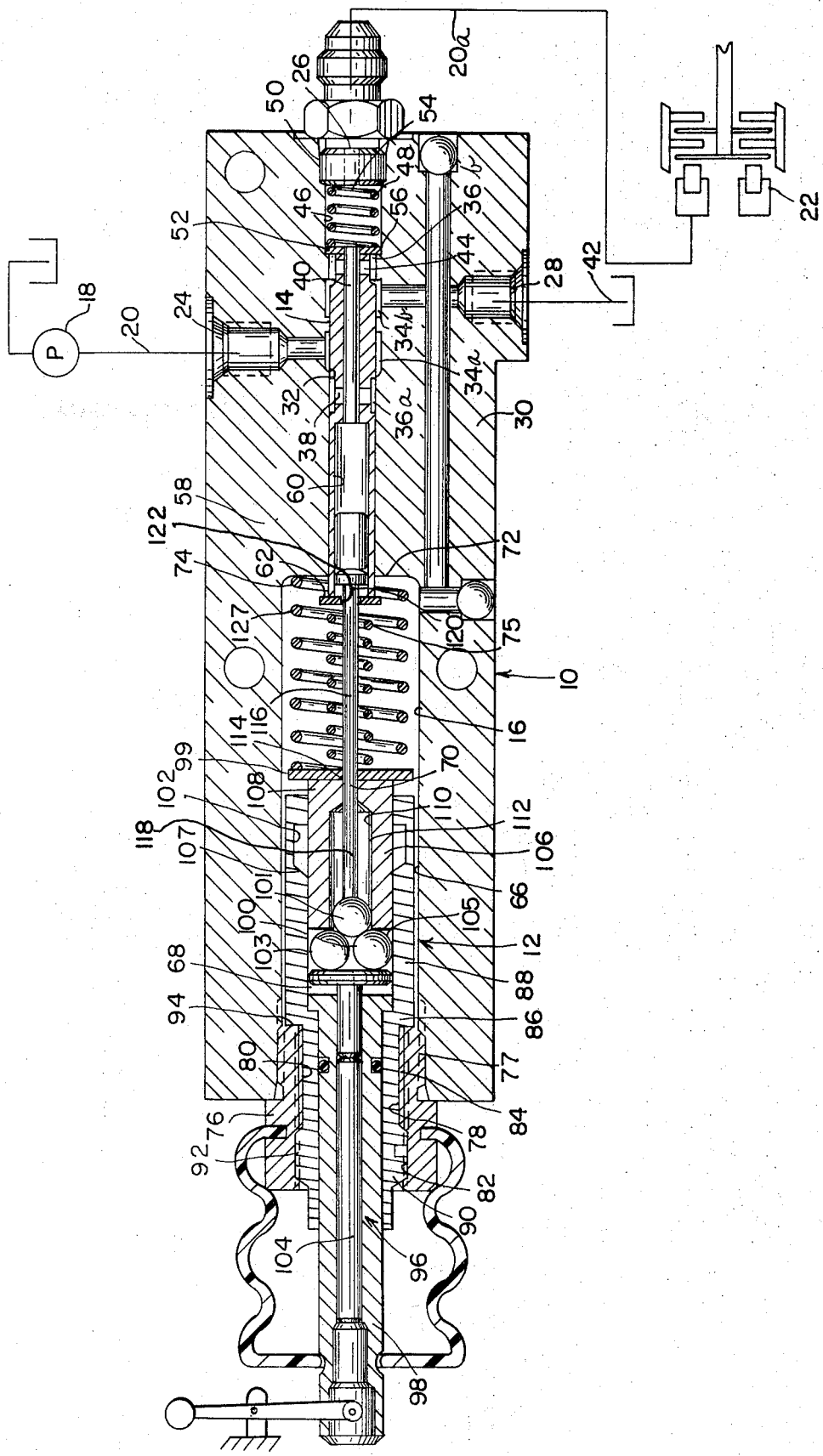

HYDRAULIC CONTROL VALVE WITH PRESSURE SENSITIVE LATCH

This invention relates to hydraulic valve devices, and more particularly to a detent locking and release mechanism for such valves. A detent holding mechanism is provided for locking the valve spool of the hydraulic valve in a predetermined position and a release member for knocking out said detent holding member upon the reduction of fluid pressure in the valve.

Tractor vehicles in use today for the most part are provided with independent power take-off assemblies. These assemblies are driven by the tractor's engine, normally, force being delivered therebetween either by gear or hydraulic means. When a hydraulic means is employed a reliable as well as accurate means for controlling pressure through the friction clutch means is a necessary requirement. That is jerky stops, starts, and slippage in the power train must be avoided. An additional requirement is also a necessity that being the safety factor. As often happens, the operator of the farm tractor for instance, while using an IPTO assisted implement will terminate his operations, turn off his tractor's power system and perform other tasks, etc. Sometime thereafter the operator returns and starts his vehicle and to his surprise or dismay discovers he has forgotten to disengage the IPTO assembly and that his trail behind implement is engaged and functioning. In the case of mowers, shreaders, blowers, etc., very obvious safety problems are apparent. Therefore, the operator should be provided with an IPTO actuating hydraulic valve which can be manually disengaged or automatically disengaged upon the deactivation of the tractor means.

It is therefore, an object of this invention to provide a hydraulic control valve having a manually actuatable detent locking means and an automatic detent unlatching means. It is still another object of this invention to provide a tractor having a hydraulically actuated IPTO assembly which is de-activated upon the shutting down of the tractor's power source. Yet, another object of this invention is to provide a detent means which cannot be actuated unless hydraulic fluid pressure is available in the valve means.

In accordance with the invention, a hydraulic valve assembly having a locking means securing a spring-based spool in a predetermined position in response to manual pressure and a release means for unsecuring the spool upon reduction of fluid pressure therein is provided. The hydraulic assembly includes a valve body having a stepped bore extending axially therethrough and a series of inlet and outlet ports which perform different functions depending upon the location of the valve spool. The valve spool has corresponding land and groove means to facilitate the metering of high pressure fluid therethrough. Further it is provided with a spring means which biases it into a neutral position. A detent means is also included being made up of a detent locking as well as a detent release means, both of which are carried in the bore above mention, but laterally offset from the valve means. The detent locking means includes a series of sleeve means fitting one inside of the other and a manually actuable piston means which carries a series of ball means in a horizontal manner against a series of compression springs. The ball means upon a sufficient horizontal movement of the piston means will fall into channels cut in the sleeve means thereby locking the piston assembly in position. It should be noted that of the compression springs above mentioned, only one thereof transfers movement to the spool. That is, upon actuation of the piston means force is transferred through the spring means to shift the spool such that fluid begins to pass therethrough. The release means includes a plunger means, one end of which extends into a power chamber formed in the spool and the other end which contacts the ball series. Thus, upon passage of pressurized hydraulic fluid through the valve, the power chamber is actuated which forces the plunger in a direction opposite to that of the aforementioned detent piston thereby facilitating the locking lockup in the aforementioned grooves. Thus, if the operator turns off the engine on his vehicle the fluid pumping means is de-activated and the force generated by the power chamber rapidly falls to a point where the springs are able to drive the balls from the grooves thereagainst. Immediately thereafter the centering springs return both the detent and the spool means to a neutral position.

Other objects and advantges of the invention will become apparent upon reading the following detailed description and upon reference to the drawing, in which the FIGURE is an enlarged sectional view of the valve housing showing the detent mechanism associated with the control spool.

Referring now to the FIGURE wherein is shown the subject of this invention a hydraulic valve means 10 having a detent means 12 and a spool means 14 carried in an axially extending stepped bore means 16.

The spool means 14 is designed to control the flow of high pressure fluid from pump means 18 through conduit means 20 and 20a to clutch means 22. For this purpose inlet port means 24, outlet port means 26 and dump port means 28 are provided in housing means 30. Additionally, second bore section 32 is provided with circumferential grooves 34a and b, spool means 14 having corresponding groove means 36a and b whereby fluid can pass from pump means 18 into the metering system, through channel means 38 and 40 and out to clutch means 22. As is apparent, spool means 14 as shown is in a neutral position, movement to the right allowing flow as above described, while movement to the left allows fluid to pass to dump 42 via channel means 44. Located in third bore section 46 is a compression spring means 48 contained between plug means 50 and plate means 52. Plug means 50 is threaded in third bore 46 thereby forming one end of chamber means 54, plate 52 abutting shoulder means 56 of the other end thereof. Plate 52 is secured to spool means 14 thus the assembly is continuously urged to the left by spring 48, the travel thereof being limited by shoulder means 56. The left hand portion 58 of spool 14 is provided with a channel or bore means 60 as well as travel abutting means 62 which performs a function similar to plate 52 but in the opposite direction.

As is apparent as spool 14 is re-positioned through the various metering positions, high pressure fluid is allowed to flow to clutch means 22 or to dump 42. That is, spool 14 is biased to an inactive position blocking fluid upon the release of manual forces or interuption of fluid pressure as will hereafter be explained. Manual force to actuate spool 14 is delivered through a detent means 12 positioned in a first portion 66 of bore means 16. The detent means 12 comprises a detent locking means 68 and a detent release means 70. The entire assembly being threaded into first bore portion 66 in line with the primary stepped bore means 16 of the spool assembly, however, having a diameter substantially larger. The junction of the two bore means 60 and 66 providing the shoulder means 72 as previously mentioned. The juncture further provides an abutment against which one end of a first detent centering spring means 74 reacts.

The detent locking means further includes a sleeve or bushing means 76, fitting bore means 66 and being secured therein by threaded coupling 77. The bore 78 of sleeve 76 having a first diameter portion 80 and a second reduced diameter portion 82, a groove 84 means running the entire length thereof. A tubular detent means 86 having a first diameter portion 88 which corresponds to that of second bore means 66 and a second diameter portion 90 having a spline means 92. In operation the groove 84 and spline 92 are aligned and sleeve 76 is slid over tubular detent 86 and rotated to achieve locking. The first diameter portion 88 abutting end 94 to prevent movement in the other direction.

Slidably carried within tubular detent 86 is an inner plunge means 96 constrained for axial movement with respect thereto. Specifically, upon manual actuation of rod means 98 the entire inner plunger means 96 moves right against first and second detent centering spring means 74 and 75. Second detent centering spring means 75 is compressed between travel abutting means 62 and plate means 99 overcoming spring means 48 causing spool 14 to shift rightwardly. The inner plunger means 96 includes a series of cam means 100, 101 and 103 preferably balls, which in conjunction with channel means 102 in tubular detent 86 form the lock mechanism whereby plunger 96 is secured against compressed spring means 74 and 75. Rod means 98 adjustably carries a piston means 104 which forms one side of a movable chamber 105 wherein ball means 103, 101 and 105 are carried. The other wall of chamber 105 is formed by a detent sleeve means 106 which carries on end 108 the aforementioned plate means 99. The detent release means 70 includes a stepped bore means 110 passing through the center of detent sleeve 106 a first portion 112 thereof having a diameter sufficient to accommodate one of said ball means 101. The second portion 114 shiftable carrying a stem plunger means 116 having a first section means which extends into the first bore portion 112 of the detent sleeve. The second section 120 extending through an aperture 122 in travel abutting means 62, into bore means 60, which upon the introduction of hydraulic fluid forms a power chamber.

In operation, force is delivered to rod means 98, which shifts the entire inner plunger assembly 96 to the right allowing high pressure fluid to pass through spool means 14. As a result, ball means 103 and 105 will engage channel means 102 being urged thereinto by ball means 101. As previously stated porting and channel allow bore 60 to assume the roll of a power chamber, the fluid pressure generated urging stem plunger means 116 to the left against ball means 101. As is apparent the relative balance of the spring and power chamber force is such that smooth control can be maintained over the entire cycle by the manual, or what ever, actuating forces. Thus, ball means 103, 101, and 105 are subjected to forces from two directions those axial from the left and those from the right which because of triangular arrangement of the ball means are re-directed in a radial manner. That is, ball means 103 and 105 will be snapped radially outwardly into the channel means 102 and their outer portions will engage in the channel with sufficient force to hold the assembly against spring biased return motion to its neutral position. As is apparent the radial forces are generated in power chamber 60 and dependent upon the continual flow of high pressure fluid through spool means 14. As a result the ball means will remain engaged in the channel holding the assembly in operating position as long as high pressure fluid circulates through the spool means. Upon de-activation of the pressure supply pump the detent release means 70 kicks detent locking means out and all of the assemblies shift back to a neutral position. The automatic release and return to neutral occurs as soon as the forces generated by power chamber 60 are insufficient to counter those of the return spring means. That is, detent sleeve means 106 via the spring means is pushing ball means 103 and 105 against angled shoulder 107 causing them to re-direct some of this force inwardly against ball means 103. Ball means 103 is thus forced into bore 110, the detent released, with immediate shifting into a neutral position.

Thus it is apparent that there has been provided, in accordance with the invention, a hydraulic valve that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a hydraulic control valve for IPTO assemblies having a spool manually movable in a housing through a range of metering positions, thereby controlling high pressure fluid flow and a spool detent assembly comprising:

a first sleeve means slidingly carrying a piston means, said sleeve means being fixed and having a circumferential groove means therein, said piston means including; a rod means, a second sleeve means and series of ball means, one of which is movable in and out of said second sleeve means;

a first compression spring means resisting movement of said piston means;

a second compression spring means transferring force from said piston to said spool means; and a stem means having first and second portion means, said first portion means being adjacent and capable of delivering and receiving force from said ball means, said second portion forming a power chamber within said spool dependent upon high pressure fluid for force to transfer against said ball means whereby they are forced outwardly into said circumferential groove means and fall out therefrom upon loss of the high pressure fluid.

2. The spool detent assembly of claim 1 whrein said stem means is an elongated rod means whereby upon the presence of high pressure fluid in said valve, said first end delivers force to said ball means and upon the absence of high pressure fluid from said valve said ball means deliver force to said first end.

* * * * *